United States Patent [19]

Michael et al.

[11] 3,719,697

[45] March 6, 1973

[54] TRIS-TRIMETHYLSILOXY AMINES

[75] Inventors: Keith W. Michael; Yolanda A. Peters, both of Midland, Mich.

[73] Assignee: Dow Corning Corporation, Midland, Mich.

[22] Filed: Sept. 29, 1971

[21] Appl. No.: 184,917

[52] U.S. Cl. ......260/448.2 N, 260/448.2 E, 260/999, 260/DIG. 9
[51] Int. Cl. .................................................C07f 7/10
[58] Field of Search..............................260/448.2 N

[56] References Cited

UNITED STATES PATENTS 3,658,867  4/1972  Prokai ..........................260/448.2 N

OTHER PUBLICATIONS

Maki et al., "Yukagaku", 19, (11) November 1970.

*Primary Examiner*—Daniel E. Wyman
*Assistant Examiner*—P. F. Shaver
*Attorney*—Robert F. Fleming, Jr. et al.

[57]  ABSTRACT

Amines of the formula $(Me_3SiO)_3Si(CH_2)_3NHMe$ and $(Me_3SiO)_3Si(CH_2)_3NMe_2$ are useful as bactericides and fungicides.

3 Claims, No Drawings

TRIS-TRIMETHYLSILOXY AMINES

The composition $(Me_3SiO)_3Si(CH_2)_3NMe_2$ is disclosed by Maki et al, "Yukagaku" 19 (11) November 1970; Chem. Abstracts 74(8)32907 Feb. 22, 1971. Applicants made the compounds of this invention prior to November 1970.

The compositions of this invention are useful as surfactants and as bactericides and fungicides. The latter utility is claimed in the copending application of Eugene A. Abbott and Alan J. Isquith entitled "Method of Inhibiting the Growth of Bacteria and Fungi" Ser. No. 184,918, filed concurrently herewith.

This invention relates to amines of the formula $(Me_3SiO)_3Si(CH_2)_3NMe_nH_{2-n}$ in which $n$ is an integer from 1 to 2.

In the specification and claims Me is the methyl radical.

The amines are made by reacting $Cl(CH_2)_3Si(OSiMe_3)_3$ with methyl or dimethylamine. The silicone starting material is made by cohydrolyzing $Me_3SiCl$ and $Cl(CH_2)_3i(OMe)_3$.

The following examples show the preparation of the compositions of this invention.

EXAMPLE 1

0.4 mol of dimethylamine, 0.2 mole of $(Me_3SiO)_3Si(CH_2)_3Cl$ and 80 ml. of hexane were placed in an autoclave and heated at 200°C for 4 hours then allowed to stand overnight. The dimethylamine hydrochloride was removed by filtration and the filtrate was distilled to give $(Me_3SiO)_3Si(CH_2)_3NMe_2$ b.p. 78°C at 5 mm.

EXAMPLE 2

A mixture of 0.107 mole of $(Me_3SiO)_3Si(CH_2)_3Cl$, 0.62 mole of methylamine and 50 ml. of hexane were heated in an autoclave at 200°C for 4 hours then cooled overnight. The methylamine hydrochloride was removed by filtration and the product distilled to give $(Me_3SiO)_3Si(CH_2)_3NHMe$ boiling at 68°C at 5mm.

That which is claimed is:

1. An amine of the formula $(Me_3SiO)_3Si(CH_2)_3NMe_nH_{2-n}$ in which $n$ is an integer from 1 to 2.
2. The compound of claim 1 in which $n$ is one.
3. The compound of claim 1 in which $n$ is two.

* * * * *

U.S. PATENT OFFICE
UNITED STATES PATENT OFFICE
CERTIFICATE OF CORRECTION

Patent No. 3,719,697          Dated: March 6, 1973

Keith W. Michael and Yolanda A. Peters

It is certified that errors appear in the above-identified patent and that said Letters Patent are hereby corrected as shown below:

Column 1, line 22, the formula "$Cl(CH_2)_3i(OMe)_3$" should read -- $Cl(CH_2)_3Si(OMe)_3$ --.

Signed and sealed this 27th day of November 1973.

(SEAL)
Attest:
A
EDWARD M. FLETCHER, JR.
Attesting Officer

RENE D. TEGTMEYER
Acting Commissioner of Patents